United States Patent

Cramer

[15] 3,684,919

[45] Aug. 15, 1972

[54] DIMMER CIRCUIT

[72] Inventor: Mert Cramer, Los Angeles, Calif.

[73] Assignee: Berkey/Colortran Mfg., Inc., Burbank, Calif.

[22] Filed: Dec. 10, 1970

[21] Appl. No.: 96,852

[52] U.S. Cl. ............315/194, 307/252 F, 307/252 T, 315/DIG. 4, 323/22 SC, 323/24

[51] Int. Cl. ........................H05b 37/02, H05b 39/04

[58] Field of Search.........315/194, 199, DIG. 4, 272, 315/291, 307, 310, 311; 307/252 T, 252 N, 252 F; 323/21, 22 SC, 24; 240/9

[56] References Cited

UNITED STATES PATENTS 3,588,598 6/1971 Isaacs ....................315/311 X 3,336,531 8/1967 Yamada .............307/252 T X 3,319,153 5/1967 Livingston ...............323/24 X 3,521,124 7/1970 Bogner .................315/194 X

*Primary Examiner*—Paul L. Gensler

*Attorney*—Flam & Flam and Howard A. Silber

[57] ABSTRACT

A dimmer circuit for controlling the light intensity from a lamp by adjusting the firing angle of a silicon controlled rectifier (SCR) or like control element supplying ac power to the lamp. The circuit comprises a firing angle function generator which produces, in sync with each ac half cycle, a signal $f(\alpha)$ monotonically related in amplitude to SCR firing angle. Comparator circuitry triggers the SCR's when the signal $f(\alpha)$ crosses the level of a light intensity control signal linearly related e.g., to dimmer control handle position. In one embodiment, the function generator includes a capacitor charged at preselected rates during portions of each ac half cycle. The firing angle function thereby synthesized is programmable to implement any desired dimmer response.

11 Claims, 7 Drawing Figures

INVENTOR.
MERT CRAMER
BY
Flam and Flam
ATTORNEYS

INVENTOR.
MERT CRAMER
BY Flam and Flam
ATTORNEYS

DIMMER CIRCUIT

BACKGROUND OF THE INVENTION

1. Field of the Invention

The present invention relates to a dimmer circuit for controlling the light intensity from a lamp. More particularly, the invention relates to a circuit wherein control elements supplying ac power to the lamp are triggered when a signal produced by a firing angle function generator crosses a variable, light intensity setting level linearly related, e.g., to dimmer control handle position.

2. Description of the Prior Art

An objective of stage and television lighting dimmer control is to achieve approximately linear change in apparent or sensed light output as a control handle is moved through equally spaced graduations on the dimmer scale. This objective is complicated by various factors. First, the light intensity I is a non-linear function of the rms voltage E supplied to the lamp; in general, $I \cong E^{3.5}$. Moreover, human perception of light intensity variation is dependent on the ambient light level. As indicated by the well known Munsell curve, the eye can perceive very small changes in light intensity when the background level is low, whereas at high light levels, only relatively large changes in light intensity can be sensed. Further, the light sensitivity of a TV camera is substantially different than that of the human eye. Thus a TV camera may be linearly responsive to light intensity regardless of background light level.

In the past, various relationships between light intensity and dimmer control handle position have implemented. For example, autotransformer-type dimmers supply an rms voltage $E$ directly proportional to dimmer handle position. Such "linear voltage" control results in light intensity which varies as the 3.5th power of the dimmer control position. Such non-linear light output is not desirable for either television or stage use.

Alternatively, "linear light" control has been suggested as useful for television applications. Here the light intensity I is directly proportional to dimmer scale reading. Linear light control implies that $E = e_c^{3.5}$, where $e_c$ represents a control voltage linearly related, e.g., to dimmer control handle position. This non-linear voltage relationship has been difficult to implement in the past.

As another approach, "square law" control has been used to approximate the Munsell curve. Here, the light intensity I is a square law function of dimmer control handle position. That is, $$I/I_{max} = (e_c/e_{c\ max})^2$$

where $I_{max}$ is the maximum light intensity, and $e_{c\ max}$ is the maximum linear control voltage. Such square law control implies $$E/E_{max} = (e_c/e_{c\ max})^{2/3.5}$$

where $E_{max}$ is the maximum rms voltage supplied to the lamp.

In the past, square law control has been synthesized using ramp-and-pedestal type circuitry to control the firing angle of silicon controlled rectifiers, triacs or like control elements supplying ac power to a lamp. Typically, a ramp generator produces a voltage which is applied to the gate of a unijunction transistor. When the ramp voltage reaches the fixed unijunction gate conduction level, the transistor goes on, triggering the SCR. By ac syncing ramp generation, the time taken for the ramp to reach the fixed gate conduction level establishes the SCR firing angle and hence determines the rms voltage supplied to the lamp. Control of this ramp time is achieved by varying the pedestal level, that is, the voltage level from which the ramp begins to rise.

The dimmer circuits shown in U.S. Pats. No. 3,335,318 to Yancey and No. 3,397,344 to Skirpan utilize this ramp and pedestal approach. In these circuits, the pedestal level is varied as a non-linear function of dimmer control handle position so as to obtain approximately square law light response. Such prior art dimmer circuits cannot readily be modified to provide alternative light response characteristics.

In contradistinction, the present invention provides a dimmer circuit capable of providing square law, linear light, linear voltage or any other light intensity response as a function of dimmer control handle position. The inventive circuit does not employ ramp-and-pedestal control, but incorporates a firing angle function generator which may be programmed to achieve the desired dimmer response characteristics.

SUMMARY OF THE INVENTION

In accordance with the present invention, there is provided a dimmer circuit of the type wherein the light intensity from a lamp is controlled by varying the firing angle of one or more silicon controlled rectifiers or like control elements supplying ac power to the lamp. The dimmer circuit comprises a firing angle function generator which produces a signal $f(\alpha)$ monotonically related to amplitude to the control element firing angle. Comparator circuitry triggers the lamp control elements when the amplitude of signal $f(\alpha)$ crosses the level of an intensity control signal $V_c$ linearly related, e.g., to dimmer control handle position.

In a preferred embodiment, the function generator comprises a capacitor which is discharged at the beginning of each ac half cycle. The capacitor then is charged at preselected rates during portions of the ac half cycle. The charging rates are selected so as to synthesize a firing angle function $f(\alpha)$ appropriate to the desired dimmer control characteristics. Alternatively, the function generator may comprise an operational amplifier having gain breakpoints established by series or shunt connected diodes.

In a preferred embodiment, the control signal $V_c$ is provided by an operational amplifier, and is inversely proportionate to a control voltage $e_c$ supplied to the amplifier and linearly related to dimmer control handle position. Positive feedback may be provided to the amplifier to compensate for changes in lamp loading.

Thus it is an object of the present invention to provide a dimmer circuit for controlling the light intensity from a lamp by triggering SCR's supplying ac power to the lamp when the output of an SCR firing angle function generator crosses a variable, light intensity setting level linearly related e.g., to a dimmer control handle position.

BRIEF DESCRIPTION OF THE DRAWINGS

Detailed description of the invention will be made with reference to the accompanying drawings wherein like numerals designate like parts in the several figures.

DESCRIPTION OF THE PREFERRED EMBODIMENTS

The following detailed description is of the best presently contemplated modes of carrying out the invention. This description is not to be taken in a limiting sense but is made merely for the purpose of illustrating the general principles of the invention since the scope of the invention is best defined by the appended claims.

Structural and operational characteristics attributed to forms of the invention first described shall also be attributed to forms later described unless such characteristics are obviously inapplicable or unless specific exception is made.

Figure 1:
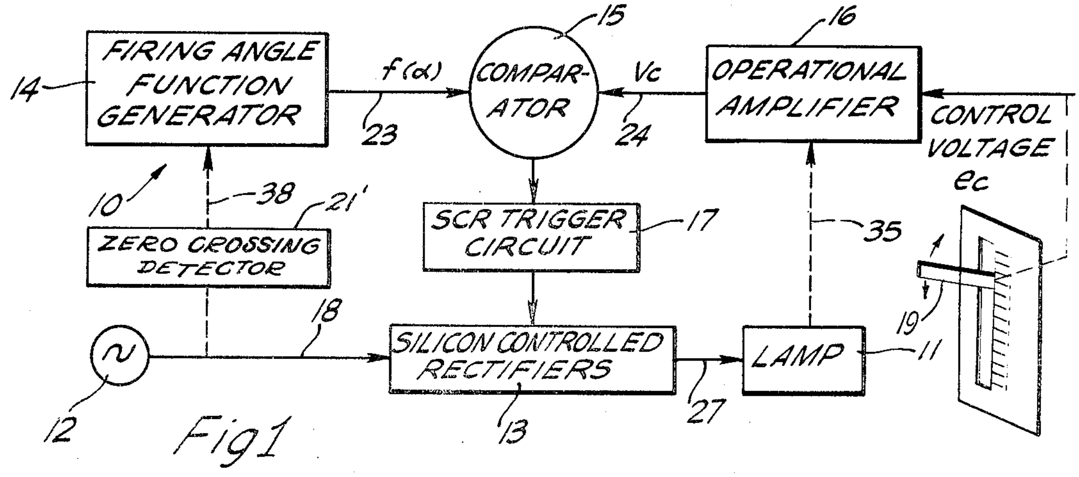
FIG. 1 is an electrical block diagram of a dimmer circuit in accordance with the present invention.

Referring now to the drawings, and particularly FIG. 1 thereof, there is shown a dimmer circuit 10 in accordance with the present invention. Dimmer circuit 10 controls the light intensity from a lamp 11 in response to a control voltage $e_c$ which may be linearly related to the position of a dimmer control handle 19. As described below, any desired relationship between light intensity and control voltage $e_c$ may be implemented by dimmer circuit 10.

Lamp 11 receives ac power from a supply 12 via one or more triacs or silicon controlled rectifiers 13, the firing angle of which is controlled by dimmer circuit 10. To this end, dimmer circuit 10 includes a firing angle function generator 14 which provides during each ac half cycle an output signal $f(\alpha)$ monotonically related in amplitude to SCR firing angle. A comparator 15 compares the amplitude of signal $f(\alpha)$ with that of a light intensity control signal $V_c$ supplied by an operational amplifier or other circuitry 16 and linearly proportionate to control voltage $e_c$. When $f(\alpha)>V_c$, comparator 15 causes an SCR trigger circuit 17 to fire SCR's 13 into conduction. This in turn provides voltage to lamp 11 for the remaining portion of the ac half cycle. The resultant SCR duty cycle establishes the light intensity from lamp 11.

Figures 2A, 2B, 2C, 2D, 3:
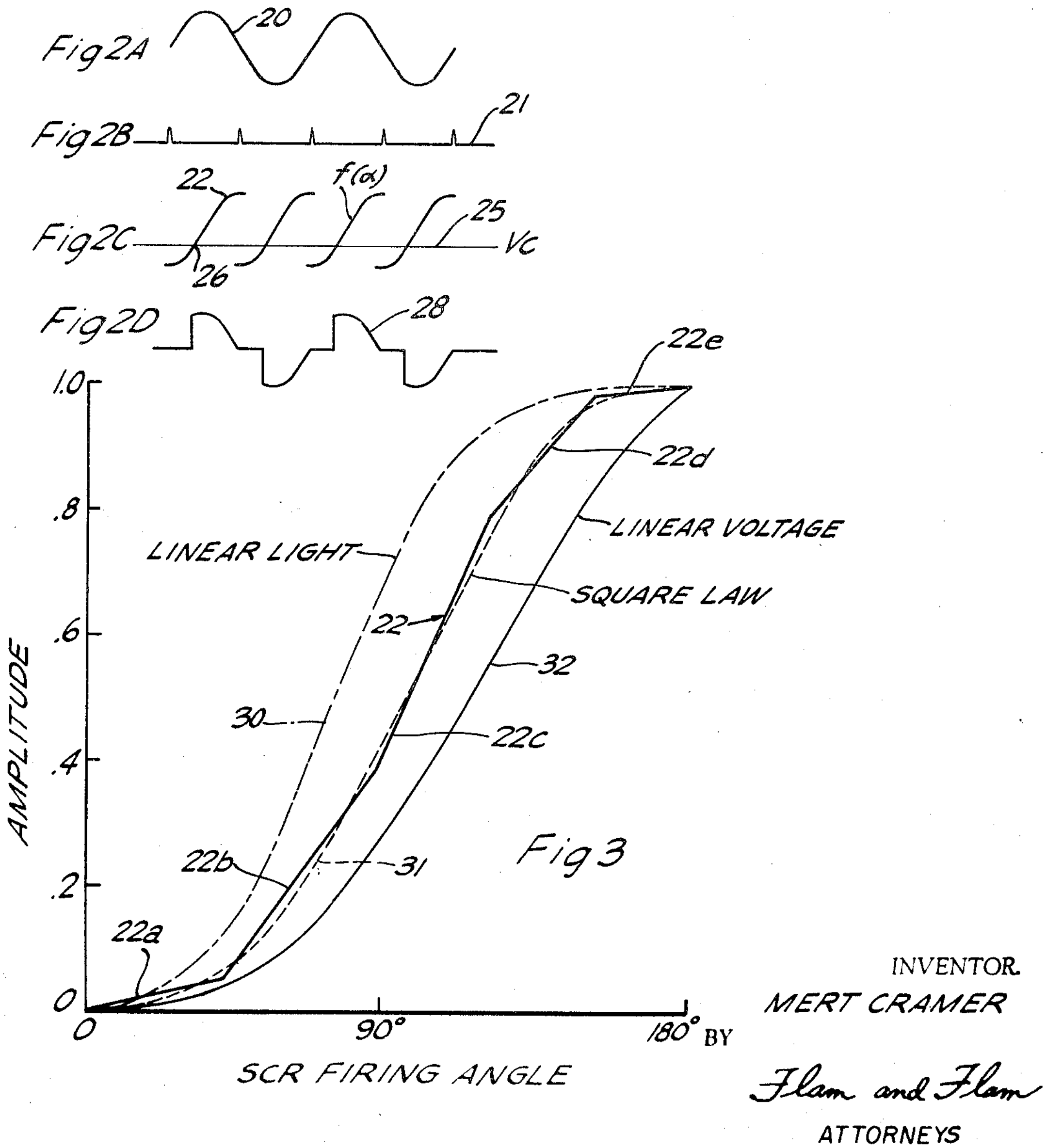
FIGS. 2A through 2D are waveforms illustrating operation of the dimmer circuit of FIG. 1.
FIG. 3 is a graph of amplitude vs. SCR firing angle for signals $f(\alpha)$ produced by a function generator included in the dimmer circuit of FIG. 1.

Operation of dimmer circuit 10 is illustrated by the waveforms of FIGS. 2A through 2D. The ac power supplied on a line 18 from ac source 12 is represented by waveform 20 of FIG. 2A. At each zero crossing of waveform 20, a sync pulse 21 (FIG. 2B) is derived by a conventional zero crossing detector 21' and used to initiate operation of function generator 14. Waveform 22 of FIG. 2C represents a typical signal $f(\alpha)$ produced on a line 23 by function generator 14. Note that signal 22 is repetitive each ac half cycle, and extends over a range of 180° of the ac waveform 20, beginning at a zero crossing thereof. The amplitude of light intensity control signal $V_c$ provided by circuitry 16 on a line 24 is represented by a horizontal bar 25 in FIG. 2C.

Comparator 15 detects the crossover point 26 (FIG. 2C) when signal $f(\alpha)$ reaches the amplitude level 25 of control signal $V_c$. At the instant of crossover, trigger circuit 17 causes SCR's 13 to conduct, and the resultant voltage supplied to lamp 11 on a line 27 is represented by waveform 28 in FIG. 2D. Clearly, the rms voltage provided to lamp 11 is established by the control voltage $e_c$, which linearly determines the level $V_c$, and by the function $f(\alpha)$ represented by waveform 22.

Selection of a firing angle function $f(\alpha)$ appropriate for desired dimmer control response may be accomplished using a graph of the type shown in FIG. 3. In that graph, the SCR firing angle is plotted along the abscissa and ranges between 0° and 180°, corresponding respectively to the beginning and end of each ac half cycle (see waveform 20 in FIG. 2A). The amplitude of signal $f(\alpha)$ is plotted along the ordinate of FIG. 3 in normalized units. Generally, this amplitude range will correspond to the range of $V_c$ as the control voltage $e_c$ is varied between its limiting values. In this regard, the amplitude values plotted in FIG. 3 are inversely, but linearly related to control voltage $e_c$.

The equations relating control voltage $e_c$ and the rms voltage E supplied to a lamp to achieve linear light, square law and linear voltage dimmer response are set forth hereinabove. Since the relationship between SCR firing angle and rms voltage is known, the firing angle functions $f(\alpha)$ required to provide such linear light, square law or linear voltage response readily may be calculated; these functions are plotted respectively as curves 30, 31 and 32 in FIG. 3.

By synthesizing waveform 22 (FIGS. 2C and 3) to correspond to curve 31, square law response is achieved by dimmer circuit 10. Alternatively, waveform 22 could be synthesized to follow curve 30 or 32, thereby respectively achieving linear light or linear voltage control. Of course, waveform 22 need not follow any of the above-mentioned curves 30, 31 or 32, but may be synthesized to achieve any desired relationship between light intensity and control voltage $e_c$.

Note that maximum light output from lamp 11 occurs when SCR's 13 are fired at 0°. Using waveform 22 of FIG. 3, maximum light output results when control signal $V_c$ is at a minimum level. Accordingly, control voltage $V_c$ preferably is inversely proportionate to control voltage $e_c$. For example, $V_c$ may equal $[1 - (e_c/e_{c\,max})]$. Such inverse proportionality of control signal $V_c$ to control voltage $e_c$ may be implemented by a conventional operational amplifier 16.

Referring again to FIG. 1, a feedback path 35 may be provided between lamp 11 and circuitry 16 to decrease the value of $V_c$ for a particular value of control voltage $e_c$ in response to increased loading of dimmer circuit 10. The effect of such positive feedback is to decrease the SCR firing angle, thereby providing a greater rms voltage to lamp 11 to compensate for the increased loading.

Figure 4:
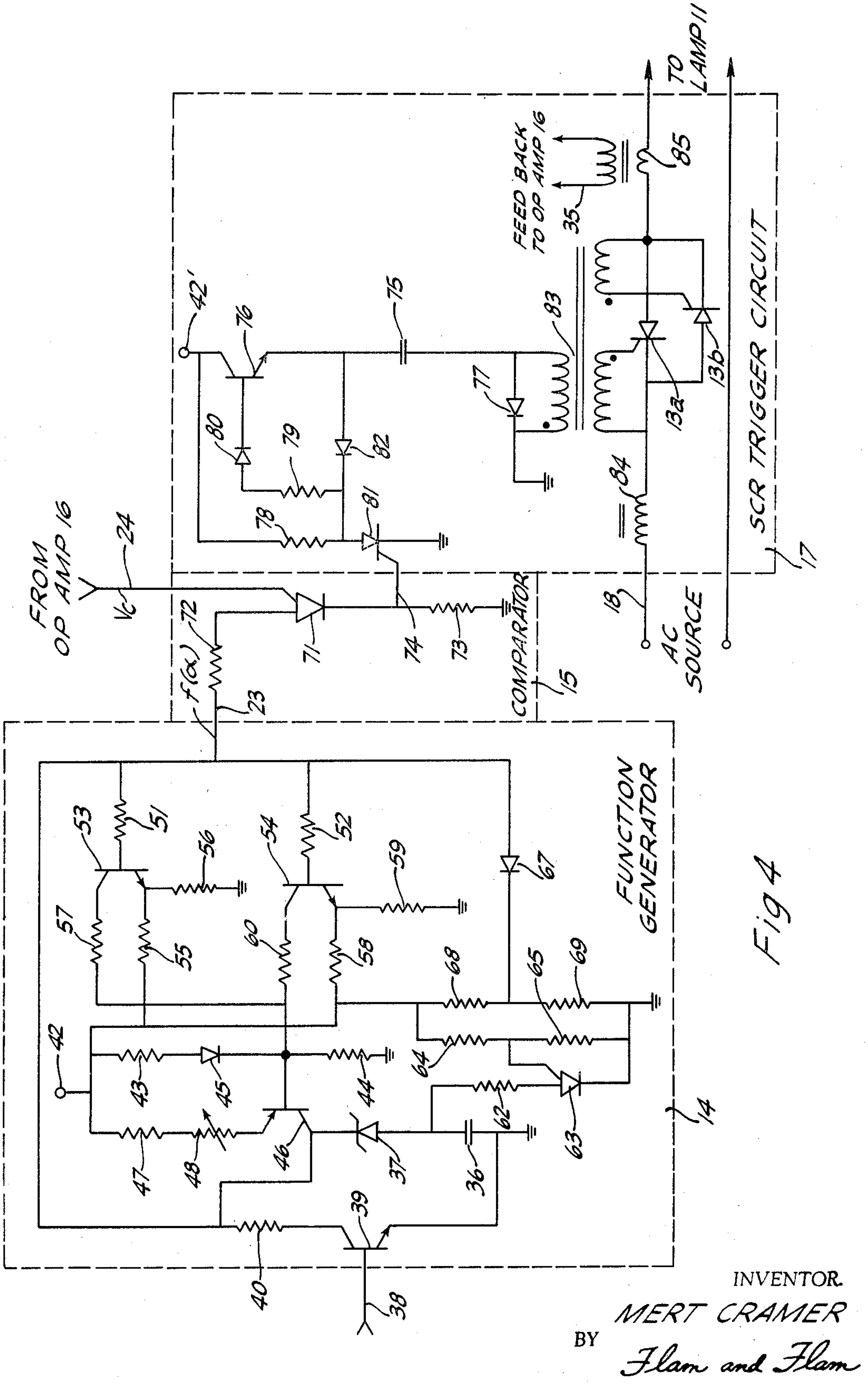
FIG. 4 is an electrical schematic diagram of a typical embodiment of the dimmer circuit also shown in FIG. 1.

An illustrative embodiment of dimmer circuit 10 is shown in FIG. 4. Referring thereto, function generator 14 includes a capacitor 36 which is discharged at the beginning of each ac half cycle, and which is charged at preselectable rates during portions of each ac half cycle. The voltage on capacitor 36, which is supplied to line 23 via a Zener diode 37, represents function $f(\alpha)$.

To discharge capacitor 36 at each ac zero crossing, sync pulses (represented by waveform 21 of FIG. 2B) are supplied to function generator 14 via a line 38. Occurrence of a sync pulse causes a transistor 39 to conduct, thereby providing a discharge path for capacitor 36 through diode 37, a resistor 40, and transistor 39. When the sync pulse terminates, transistor 39 goes off, and charging of capacitor 36 is initiated.

Positive voltage provided at a terminal 42 (FIG. 4) is divided by resistors 43,44 and series diode 45 to bias on a transistor 46. Accordingly, a charging path is provided from voltage source 42 through resistors 47 and 48, transistor 46 and and diode 37 to capacitor 36. The initial charging rate of capacitor 36 through this path is determined by the setting of variable resistor 48; this setting establishes the slope of the initial portion 22*a* of waveform 22 (FIG. 3).

The voltage on capacitor 36 also is supplied via resistors 51 and 52 to the bases of respective transistors 53, 54. The emitter of transistor 53 is biased to a level set by voltage dividing resistors 55, 56 connected between terminal 42 and ground. When the voltage on capacitor 36 reaches the valve at which transistor 53 begins to conduct, resistors 56 and 57 are shunted across the base bias resistor 44 of transistor 46. As a result, conduction through transistor 46 increases, concomitantly increasing the charging rate of capacitor 36. This results in the steeper portion 22*b* of waveform 22.

Similarly, transistor 54 begins to conduct when the voltage on capacitor 36 reaches a level established by the values of resistors 58 and 59. As a result, resistors 59 and 60 also are shunted across resistor 44, further increasing the charging rate of capacitor 36. This produces in the waveform portion 22*c* of FIG. 3.

The voltage on capacitor 36 also is directed via a resistor 62 to the anode of a programmable unijunction transistor 63, the cathode of which is connected to ground. The gate voltage on transistor 63 is established by a voltage divider comprising resistors 64 and 65. When the voltage across capacitor 36 exceeds the gate bias on transistor 63, transistor 63 begins to conduct, thereby shunting resistor 62 across capacitor 36. As a result, the current supplied by transistor 46 is shared by capacitor 36 and resistor 62, effecting a decreased charging rate of capacitor 36. This produces the waveform portion 22*d* of FIG. 3.

Also receiving the voltage on capacitor 36 is a diode 67 biased to a voltage level determined by resistors 68 and 69. When the voltage on capacitor 36 reaches a sufficiently high value, diode 67 begins to conduct, clamping the voltage across capacitor 36, and producing waveform portion 22*e*. Finally, at the end of the ac half cycle, the next sync pulse 21 turns on transistor 39 again to discharge capacitor 36.

The slopes and breakpoints of the various waveform portions of the signal $f(\alpha)$ produced by function generator 14 may be controlled by judicious component selection. Moreover, additional transistors analagous to those designated 53 and 54 may be used to provide a greater number of waveform portions of increasing slope. Similarly, additional unijunction transistors analagous to that designated 63 may be used to provide more waveform portions of decreasing slope. In this manner, any desired function $f(\alpha)$ may be synthesized by function generator 14.

As shown in FIG. 4, comparator 15 may be implemented using a programmable unijunction transistor 71 the anode of which receives via a resistor 72 the signal $f(\alpha)$ from function generator 14. The control signal $V_c$ on line 24 is applied directly to the gate of transistor 71. Transistor 70 goes into conduction whenever the anode voltage exceeds the gate voltage. Thus an output trigger signal will appear across a cathode resistor 73 as soon as the amplitude of signal $f(\alpha)$ exceeds that of control signal $V_c$. The output trigger signal from comparator 15 is supplied via a line 74 to SCR trigger circuit 17.

Trigger circuit 17 (FIG. 4) may comprise a capacitor 75 which is precharged via a transistor 76 and a diode 77. Transistor 76 itself is biased on by a voltage supplied via terminal 42', resistors 78, 79 and a diode 80.

Capacitor 75 is discharged to trigger SCR's 13*a*, 13*b* upon occurrence of an output trigger signal from comparator 15. Accordingly, the trigger signal is applied to the gate of an SCR 81 in trigger circuit 17. When SCR 81 fires, capacitor 75 rapidly is discharged through the path including SCR 81, a diode 82 and the primary of a pulse transformer 83. The resultant signals induced in the secondaries of transformer 83 cause firing of SCR's 13*a* and 13*b* to supply power to lamp 11. Current flow through line 18 to lamp 11 is smoothed by an inductor 84, and a transformer 85 connected in series with lamp 11 provides a feedback signal via line 35 to operational amplifier 16.

Although one example of a function generator 14 has been described herein, the invention is not so limited. For example, function generator 14 may comprise an operational amplifier provided with appropriate series- and/or shunt-connected diodes to control the amplifier gain breakpoints and hence establish the shape of function $f(\alpha)$. Moreover, while function $f(\alpha)$ has been illustrated as monotonically increasing, this is not required, and a function decreasing in amplitude with increasing firing angle may be employed. In such instance, the control signal $V_c$ preferably is directly rather than inversely proportionate to $e_c$. Further, although full wave operation has been described, using two silicon controlled rectifiers 13*a* and 13*b*, half wave operation also could be used. In such instance, the function $f(\alpha)$ produced by generator 14 may occur only during alternate ac half cycles.

The applicant intends to claim all novel, useful and unobvious features shown or described. Accordingly, applicant reserves the right to amend these claims and/or to present new claims in this or any proper reissue application.

I claim:

1. In a dimmer circuit of the type wherein the light intensity from a lamp is adjusted by controlling the firing angle of one or more series-control elements supplying ac power to said lamp, the improvement consisting of:

a firing angle function generator for producing during each ac half cycle a signal $f(\alpha)$ monotonically related in amplitude to control element firing angle, comparator means for triggering said control elements when said signal $f(\alpha)$ crosses an adjustable, light intensity setting level linearly related to the position of an operator actuated dimmer control handle, said function generator comprising:

a. a capacitor, b. means for discharging said capacitor at the beginning of each ac half cycle, and c. means for charging said capacitor at selectable rates during said half cycle, said signal $f(\alpha)$ being represented by the voltage across said capacitor.

2. A dimmer circuit as defined in claim 1 wherein said means for charging comprises:

a first transistor connected between a source of voltage and said capacitor, a base bias resistor establishing the magnitude of current supplied to said capacitor by said first transistor, a second transistor, the voltage across said capacitor being supplied to the base of said second transistor, at least one resistor effectively shunted across said base bias resistor by conduction of said second transistor when the voltage across said capacitor exceeds a preselected value, shunting of said resistors causing an increase in the charging rate of said capacitor, a programmable unijunction transistor and a series resistor connected in shunt with said capacitor, and means for biasing said unijunction transistor to initiate conduction thereof when the voltage across said capacitor exceeds a preset value established by the bias on said unijunction transistor, conduction through said transistor and series resistor causing a decrease in the charging rate of said capacitor.

3. A dimmer circuit as defined in claim 1 wherein the amplitude of said signal $f(\alpha)$ increases between a minimum value at the ac zero crossing initiating said half cycle and a maximum value at the end of said half cycle, and wherein said light intensity setting level is inversely proportionate to a linear control voltage.

4. A dimmer circuit as defined in claim 3 further comprising:

operational amplifier means, receiving said linear control voltage, for establishing said light intensity setting level.

5. A dimmer circuit for controlling the light intensity from a lamp in response to a control voltage $e_c$ linearly related to the position of a dimmer control handle, comprising:

at least one silicon controlled rectifier series connected between a source of ac power and said lamp, a firing angle function generator producing during each ac half cycle a signal $f(\alpha)$ monotonically related in amplitude to SCR firing angle, and comparator means for triggering said silicon controlled rectifiers each time said signal $f(\alpha)$ crosses an amplitude level established by said control voltage $e_c$, and wherein said firing angle function generator comprises:

a capacitor, discharge means for discharging said capacitor in synchronism with the zero crossings of said ac power, and waveshape control circuit means for charging said capacitor at preselectable rates during each ac half cycle, the voltage across said capacitor corresponding to said signal $f(\alpha)$, said signal $f(\alpha)$ thereby comprising a piecewise linear approximation of a selected dimmer response curve.

6. A dimmer circuit as defined in claim 5 wherein said discharge means comprises:

a transistor and a current limiting resistor shunting said capacitor, and sync pulse means for pulsing on said transistor in synchronism with said zero crossings.

7. A dimmer circuit as defined in claim 5 wherein said comparator means comprises:

a programmable unijunction transistor, said signal $f(\alpha)$ establishing the anode voltage of said transistor, and means for providing at the gate of said transistor a voltage $V_c$ linearly proportionate to said control voltage $e_c$.

8. A dimmer circuit as defined in claim 5 wherein said circuit means further comprises:

a first transistor supplying current to said capacitor, a base bias resistor establishing the magnitude of current supplied by said first transistor, a second transistor, the voltage across said capacitor being supplied to the base of said second transistor, at least one resistor shunted across said base bias resistor by conduction of said second transistor when the voltage across said capacitor exceeds a selector value, thereby increasing current to said capacitor.

9. A dimmer circuit as defined in claim 5 wherein said waveshape control circuit means comprises:

means for providing current to said capacitor, at least one means for increasing the amount of current provided to said capacitor when the voltage across said capacitor exceeds corresponding selected levels, and at least one means for decreasing the amount of current provided to said capacitor when the voltage across said capacitor exceeds other corresponding selected levels.

10. A dimmer circuit as defined in claim 5 wherein said circuit means comprises:

means for providing current to said capacitor, means responsive to the voltage level across said capacitor for reducing the current supplied to said capacitor when said voltage level exceeds a preset value.

11. A dimmer circuit as defined in claim 10 wherein said means responsive comprises:

a programmable unijunction transistor and a series resistor connected in shunt with said capacitor, and means for biasing said unijunction transistor to initiate conduction thereof when the voltage across said capacitor exceeds a preset value established by the bias on said unijunction transistor, conduction through said transistor and series resistor thereby decreasing the charging rate of said capacitor.

* * * * *